(12) United States Patent
Baqai et al.

(10) Patent No.: US 10,306,139 B2
(45) Date of Patent: May 28, 2019

(54) TARGET IMAGE QUALITY ENHANCEMENT USING A GUIDE IMAGE

(71) Applicant: Apple Inc., Cupertino, CA (US)

(72) Inventors: Farhan Baqai, Fremont, CA (US); Zahra Sadeghipoor Kermani, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/978,114

(22) Filed: May 12, 2018

(65) Prior Publication Data

US 2018/0338082 A1 Nov. 22, 2018

Related U.S. Application Data

(60) Provisional application No. 62/506,729, filed on May 16, 2017.

(51) Int. Cl.
*H04N 5/232* (2006.01)
*G06T 5/50* (2006.01)
*H04N 5/265* (2006.01)

(52) U.S. Cl.
CPC ........... *H04N 5/23235* (2013.01); *G06T 5/50* (2013.01); *H04N 5/232939* (2018.08); *H04N 5/265* (2013.01); *G06T 2207/20221* (2013.01)

(58) Field of Classification Search
None
See application file for complete search history.

(56) References Cited

U.S. PATENT DOCUMENTS

2017/0091908 A1* 3/2017 Takeda .................... G06T 5/002

* cited by examiner

*Primary Examiner* — Mark T Monk
(74) *Attorney, Agent, or Firm* — Fernando & Partners, LLP; William J. Higley

(57) ABSTRACT

In various implementations, a method includes obtaining a target image having a first resolution and comprising a plurality of target pixels having a plurality of corresponding target pixel values, obtaining a guide image having a second resolution and comprising a plurality of guide pixels having a plurality of corresponding guide pixel values, and generating an enhanced target image based on the target image and the guide image, the enhanced target image having the second resolution and comprising a plurality of enhanced target pixels having a plurality of corresponding enhanced target pixel values. In various implementations, determining, for a particular upscaled target pixel, a similarity metric indicative of the similarity of a neighborhood of pixels around the particular upscaled target pixel to a neighborhood of pixels around a corresponding guide pixel, and determining, for the particular upscaled target pixel, an enhanced target pixel value based on the similarity metric.

20 Claims, 9 Drawing Sheets

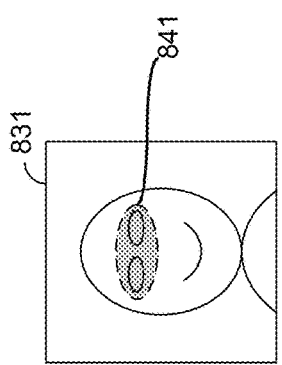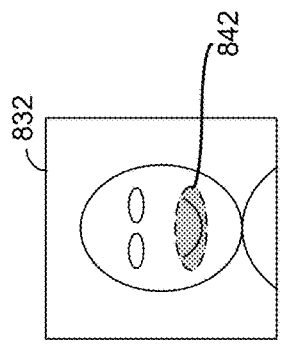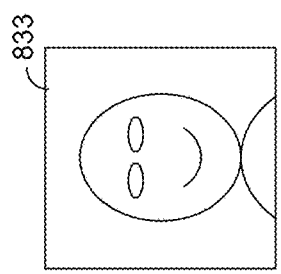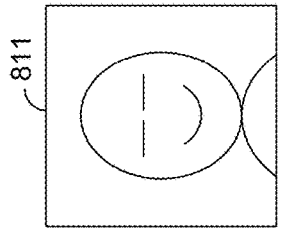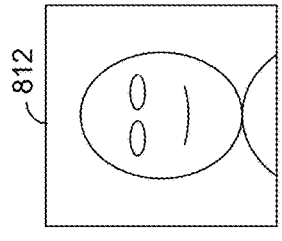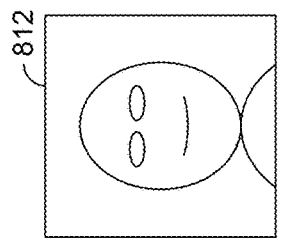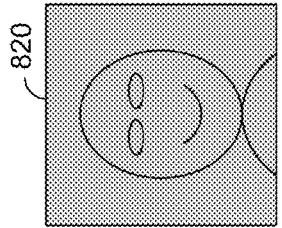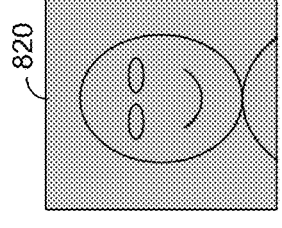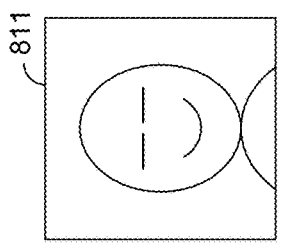
FIG. 8A    FIG. 8B    FIG. 8C

TARGET IMAGE QUALITY ENHANCEMENT USING A GUIDE IMAGE

RELATED APPLICATION

This application claims priority to U.S. Provisional Patent Application No. 62/506,729, filed on May 16, 2017, entitled "Target Image Quality Enhancement Using A Guide Image," the entire contents of which are incorporated herein by reference.

TECHNICAL FIELD

The present disclosure relates generally to image processing, and in particular, to enhancing the quality of a target image using a guide image.

BACKGROUND

In various circumstances, images are compressed (which may including downscaling) in order to efficiently process, store, or transmit the images. For videos (e.g., ordered sequences of images), compression can be applied in both spatial and temporal domains. In many cases, this compression results in loss of details, blurry edges, blocking artifacts, or otherwise degrades the quality of the image. In many cases, the compression is lossy and irreversible.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 8A-8C illustrate the result of merging high-quality images with one or more selected low-quality image.

Figure 1:
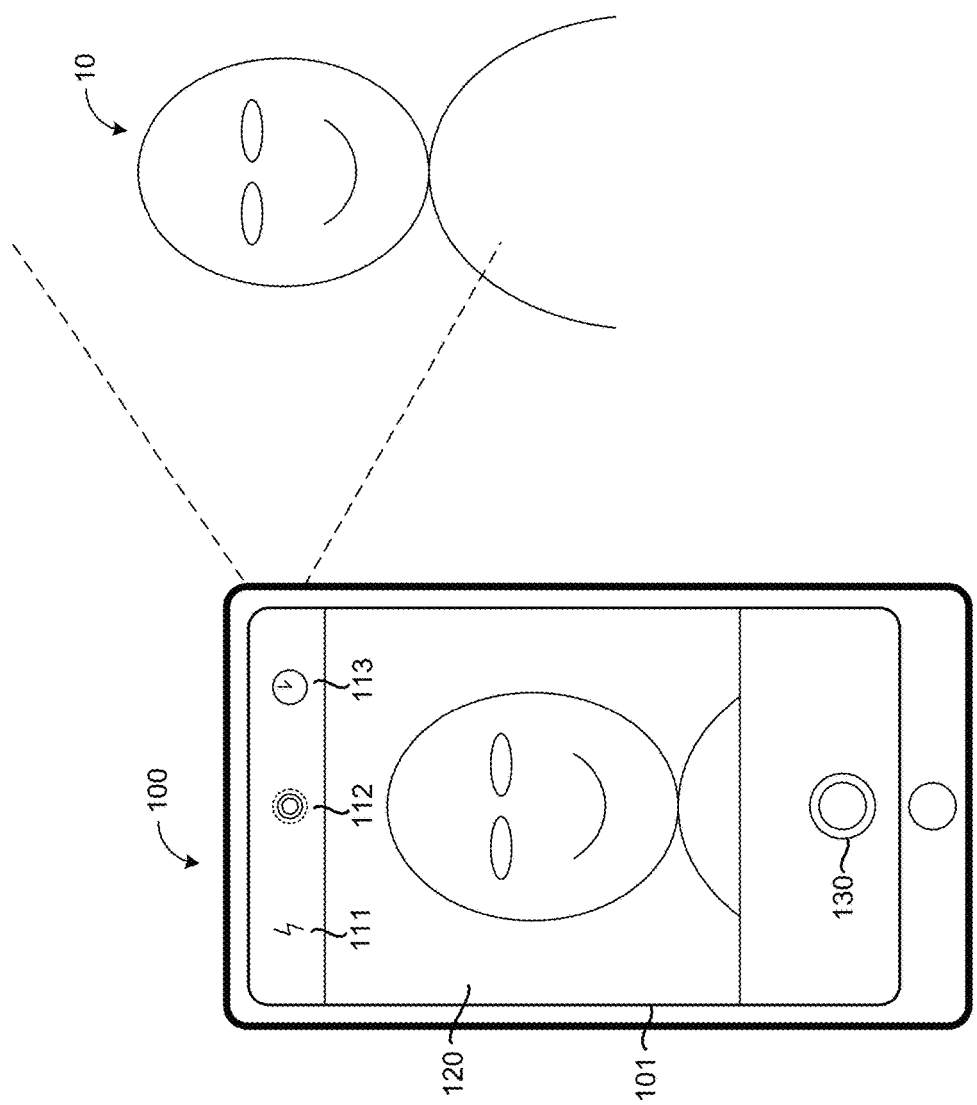
FIG. 1 illustrates an electronic device surveying a scene including a subject 10.

In accordance with common practice, various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Although images may be compressed in a manner in which information is lost, in some circumstances, it is possible to retrieve some of the lost information of a low-quality image (such as a compressed image) using a high-quality image (such as an uncompressed image) with at least partially similar content.

Described herein are methods and system for merging a low-quality, high-contextual-relevance image with a high-quality, low-contextual-relevance image to create a high-quality, high-contextual-relevance image. For example, a low-quality image of a subject at a moment at which their eyes are open can be merged with a high-quality image of the subject at a moment at which their eyes are closed to create a high-quality image at a moment at which their eyes are open. As another example, a low-quality image of a sporting event at a crucial moment (e.g., a buzzer-beater shot of a basketball entering the hoop) can be merged with a high-quality image a second before or after the crucial moment to create a high-quality image at the crucial moment.

The low-quality image and high-quality image can be obtained in a variety of ways. In some embodiments, an image capture device captures, in response to a user trigger, a high-quality image along with a sequence of low-quality images starting at a period before and ending at a period after the high-quality image is taken. In another embodiment, a video stream is compressed (e.g., for efficient processing, storage, or transmission), but periodic frames are uncompressed in order to allow recovery of at least some of information lost in the compression.

FIG. 1 illustrates an electronic device 100 surveying a scene including a subject 10. The electronic device 100 includes a touch-sensitive display 101 displaying a graphical user interface of an image capture application. The electronic device 100 includes a camera (not shown) having a field of view encompassing the subject 10.

The graphical user interface displays a number of options affordances 111-113, an image preview window 120, and a capture affordance 130. The image preview window 120 includes a live image of the scene encompassed by the camera's field of view. When the capture affordance 130 is selected (e.g., the location of the capture affordance 130 on the touch-sensitive display 101 is touched), the electronic device 100 captures an image (of the scene depicted in the image preview window 120) using the camera.

The graphical user interface displays a flash affordance 111 that can be used by a user to set a flash setting. When the flash setting is set to "ON," the electronic device 100 captures an image while triggering a flash of the camera when the capture affordance 130 is selected. When the flash setting is set to "OFF," the electronic device 100 captures an image when the capture affordance 130 is selected without triggering a flash. When the flash setting is set to "AUTO," the electronic device 100 determines whether or not to trigger the flash (e.g., based on lighting conditions of the scene) when capturing an image in response to detecting selection of the capture affordance 130.

The graphical user interface displays a timer affordance 113 that can be used by a user to set a delay period such that when the capture affordance 130 is selected, the electronic device 100 captures an image using the camera after the delay period.

The graphical user interface displays a burst affordance 112 that can be used by a user to enter (or exit) a burst photo mode. When in the burst photo mode, the electronic device 100 continually captures a sequence of low-quality images using the camera, saving the most recent set of images in a buffer. In various implementations, the buffer includes approximately 1.5 seconds of images at approximately 15 frames per second. In response to detecting selection of the capture affordance 130, the electronic device captures a high-quality image using the camera and captures another sequence of low-quality images using the camera. In various implementations, the sequence of low-quality images captured after selection of the capture affordance 130 also includes approximately 1.5 seconds of images at 15 frames per second. The electronic device 100 saves the sequence of low-quality images in the buffer, the captured high-quality image, and the sequence of low-quality images captured after the capture affordance 130 was selected.

Thus, when in burst photo mode, in response to detecting selection of the capture affordance 130, the electronic device 100 saves a plurality of low-quality images and a single high-quality image.

Figure 2:
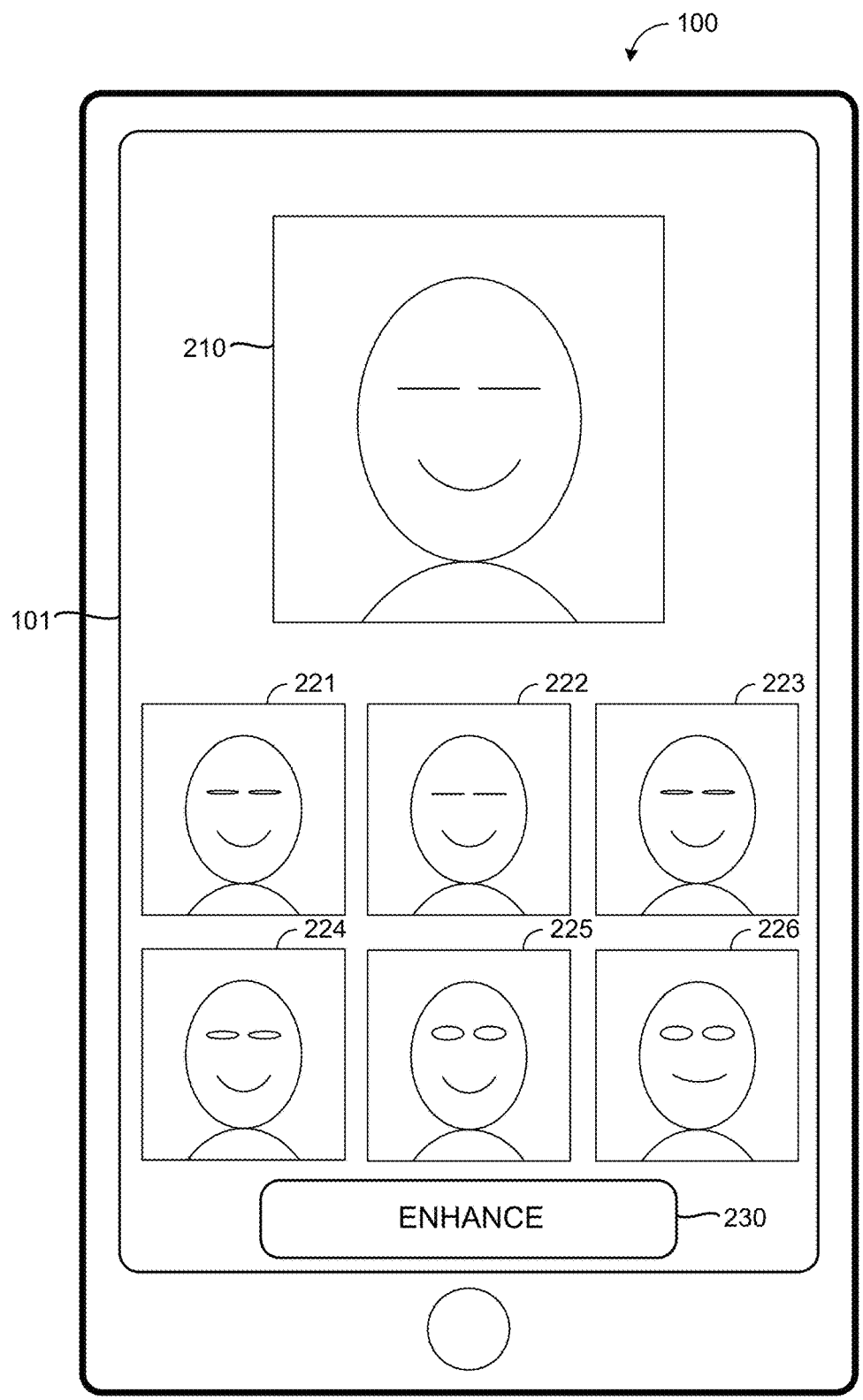
FIG. 2 illustrates the electronic device of FIG. 1 displaying an enhancing user interface on the touch-sensitive display.

FIG. 2 illustrates the electronic device 100 of FIG. 1 displaying an enhancing user interface on the touch-sensitive display 101. The enhancing user interface includes a representation 210 of a high-quality image and representations 221-226 of various low-quality images. As described above, the high-quality image and the low-quality images can be obtained in a burst photo mode. The enhancing user interface further includes an enhance affordance 230 that, when selected, enhances a selected one of the low-quality images using the high-quality image as a guide.

The representations 221-226 of the low-quality images illustrate a scene at various points in time. In the representation 221 of the first low-quality image, the subject's eyes are in the process of closing. In the representation 222 of the second low-quality image, the subject's eyes are completely closed. Similarly, in the representation 210 of the high-quality image, the subject's eyes are completely closed. In the representation 223 of the third low-quality image and the representation 224 of the fourth low-quality image, the subject's eyes are in the process of opening. In the representation 225 of the fifth low-quality image, the subject's eyes are open. In the representation 226 of the sixth low-quality image, the subject's eye are open, but the subject has ceased (or is beginning to cease) smiling. Accordingly, a user can select the fifth low-quality image (e.g., by touching the representation 225 of the fifth low-quality image on the touch-sensitive display 101) as the most contextually relevant image to be enhanced. In some embodiments, upon selection, the representation 225 of the fifth low-quality image indicates that it is selected. For example, in various implementations, the representation 225 is highlighted, bordered by a glow, or presented with an overlaid checkmark.

After the representation 225 is selected and a user selects the enhance affordance 230 (e.g., touches the touch-sensitive display 101 at the location of the enhance affordance 230), the electronic device 100 merges the high-quality image and the selected low-quality image.

Figure 3:
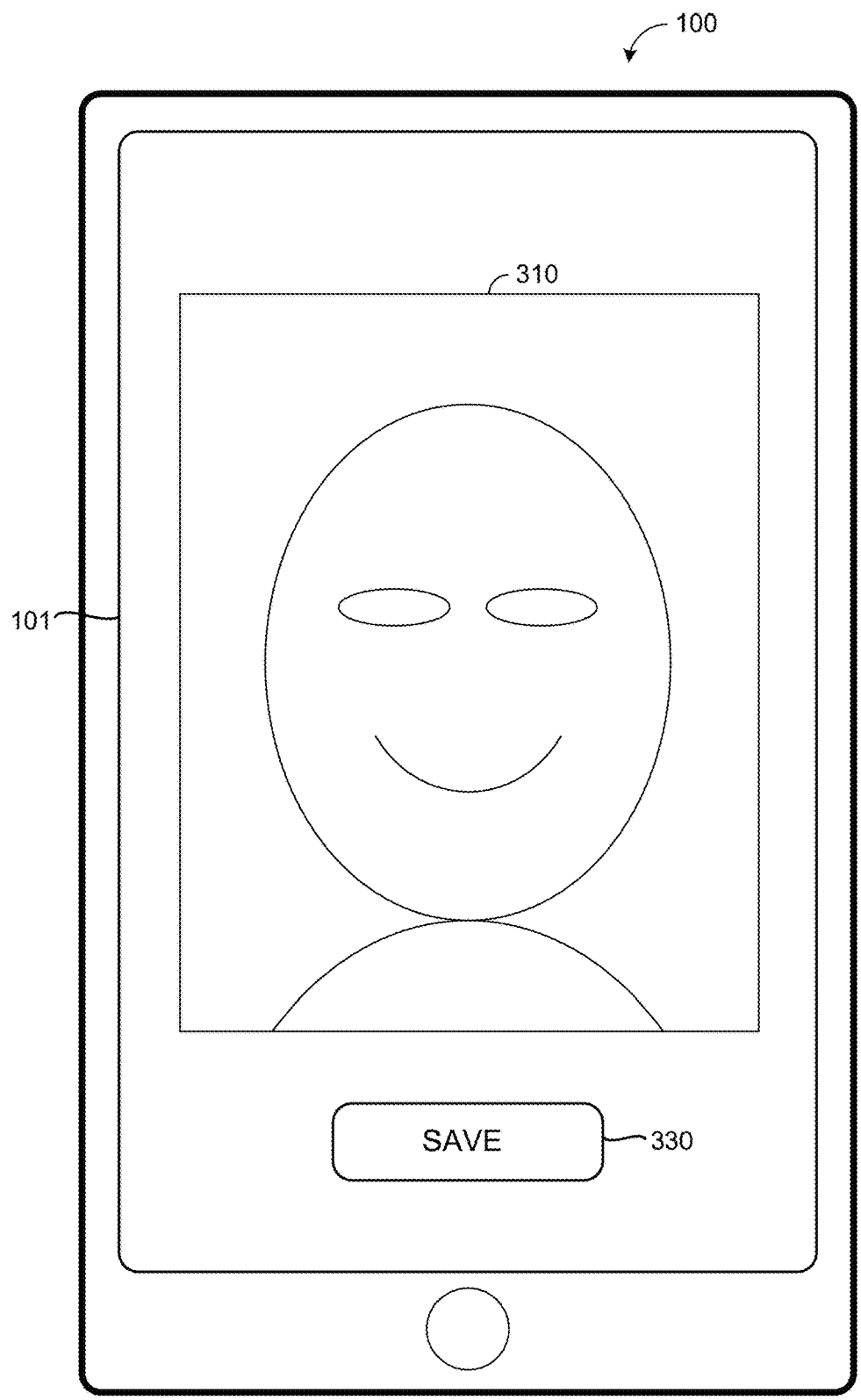
FIG. 3 illustrates the electronic device of FIG. 2 in response to merging a high-quality image and a selected low-quality image.

FIG. 3 illustrates the electronic device 100 of FIG. 2 in response to merging a high-quality image and a selected low-quality image. Displayed on the touch-sensitive display 101 of the electronic device 100 is a representation 310 of a high-quality image of the subject having open eyes and smiling. Also displayed is a save affordance 330 that can used by a user to save the generated high-quality image in a memory of the electronic device 100.

Figure 4:
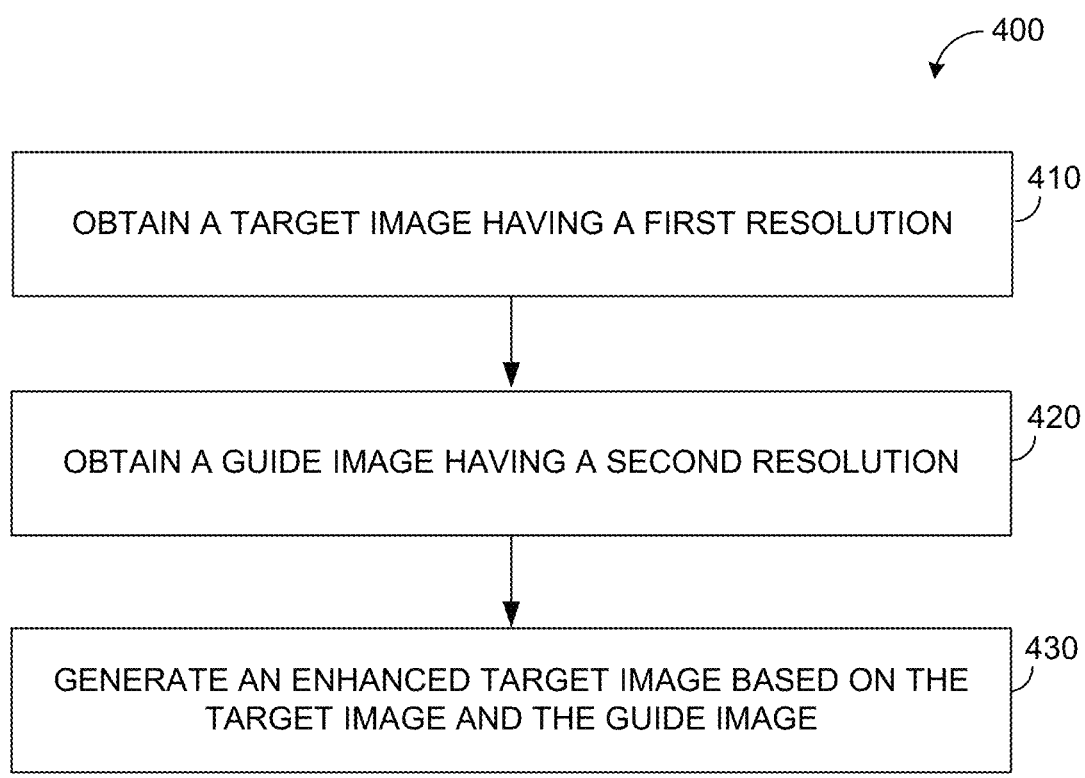
FIG. 4 is a flowchart representation of a method of enhancing the quality of a target image using a guide image in accordance with some implementations.

FIG. 4 is a flowchart representation of a method 400 of enhancing the quality of a target image using a guide image in accordance with some implementations. In some implementations (and as detailed below as an example), the method 400 is performed by an electronic device (or a portion thereof), such as the electronic device 100 of FIG. 1. In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, the method 400 includes obtaining a target image having a first resolution and a guide image having a second resolution and generating an enhanced target image (having the second resolution) based on the target image and the guide image.

The method 400 begins, at block 410, with the electronic device obtaining a target image having a first resolution. The target image comprises a plurality of target pixels having a plurality of corresponding target pixel values. In various implementations, the target pixel values range from 0 to 255. In various implementations, each target pixel is associated with three target pixels values, each corresponding to a color channel. In some embodiments, the target image includes approximately 1.5 megapixels. The method 400 continues, at block 420, with the electronic device obtaining a guide image having a second resolution (higher than the first resolution). The guide image comprises a plurality of guide pixels having a plurality of corresponding guide pixel values. In some embodiments, the guide image includes approximately 12 megapixels.

In various implementations, the target image and/or the guide image are obtained by a camera of the electronic device. For example, in various implementations, the method 400 includes detecting, via an input device of the electronic device, a capture input. In some embodiments, as described above, the capture input is a touch upon the location of a capture affordance displayed on a touch-sensitive display. In response to detecting the capture input, the electronic device captures, via a camera of the electronic device, a high-resolution image of the scene and a sequence of low-resolution images of the scene. The guide image can be the high-resolution image and the target image can be one of the low-resolution images. In some embodiments, obtaining the target image and/or the guide image includes retrieving the image from a memory or over a network.

In various implementations, obtaining the target image includes selecting one of the low-resolution images to be the target image. Thus, in some embodiments, obtaining the target image includes displaying, on a display of the electronic device, a set of potential target images of the sequence of low-resolution images of the scene and receiving, via an input device of the electronic device, a selection of the target image from the set of potential target images. In some embodiments, the display and the input device are integrated as a touch-sensitive display.

In some embodiments, the set of potential target images (shown on the display) comprises all of the sequence of low-resolution images of the scene (e.g., all of the low-resolution images captured in response to detecting the capture input). In some embodiments, the set of potential target images is a proper subset of the sequence of low-resolution images of the scene. In some embodiments, the set of potential target images comprises a downsampled sequence of the sequence of low-resolution images of the scene (e.g., every other image, every third image, or every fifth image).

In some embodiments, the set of potential target images comprises those of the sequence of low-resolution images that can be improved by the high-resolution image. For example, each of the sequence of low-resolution images can be enhanced by the guide image and the result compared with the target image (or the upscaled target image). In those case in which the enhanced target image differs from the upscaled target image by more than a threshold amount, the electronic device can display target image as one of the set of potential target images.

In various implementations, the camera of the electronic device captures multicolor images, each including multiple color components. In some embodiments, the multicolor image is an RGB image including a red component, a green component, and a blue component. In some embodiments, the multicolor image is a YCbCr image including a luma component, a first chroma component, and a second chroma component. Each component, being a matrix of values, is an "image" having a resolution and a plurality of pixels with corresponding pixel values. Thus, in various implementations, the target image and the guide image can each be a color component of a multicolor image. Similarly, in various implementations, selection of a target image can include selection of a multicolor image including the target image as a color component thereof.

The method 400 continues, at block 430, with the electronic device generating an enhanced target image (having the second resolution) based on the target image and the guide image. The enhanced target image comprises a plurality of enhanced target pixels having a plurality of corresponding enhanced target pixel values. A particular method of generating the enhanced target image is described below with respect to FIG. 5.

In various implementations, following block 430, the method 400 is repeated for each component of a multicolor image. The resulting enhanced target images represent the color components of an enhanced multicolor image.

In various implementations, following block 430, the enhanced target image is saved (e.g., into a non-transitory memory of the electronic device), displayed (e.g., on a display of the electronic device), and/or transmitted (e.g., to a photo printer communicatively coupled to the electronic device).

Figure 5:
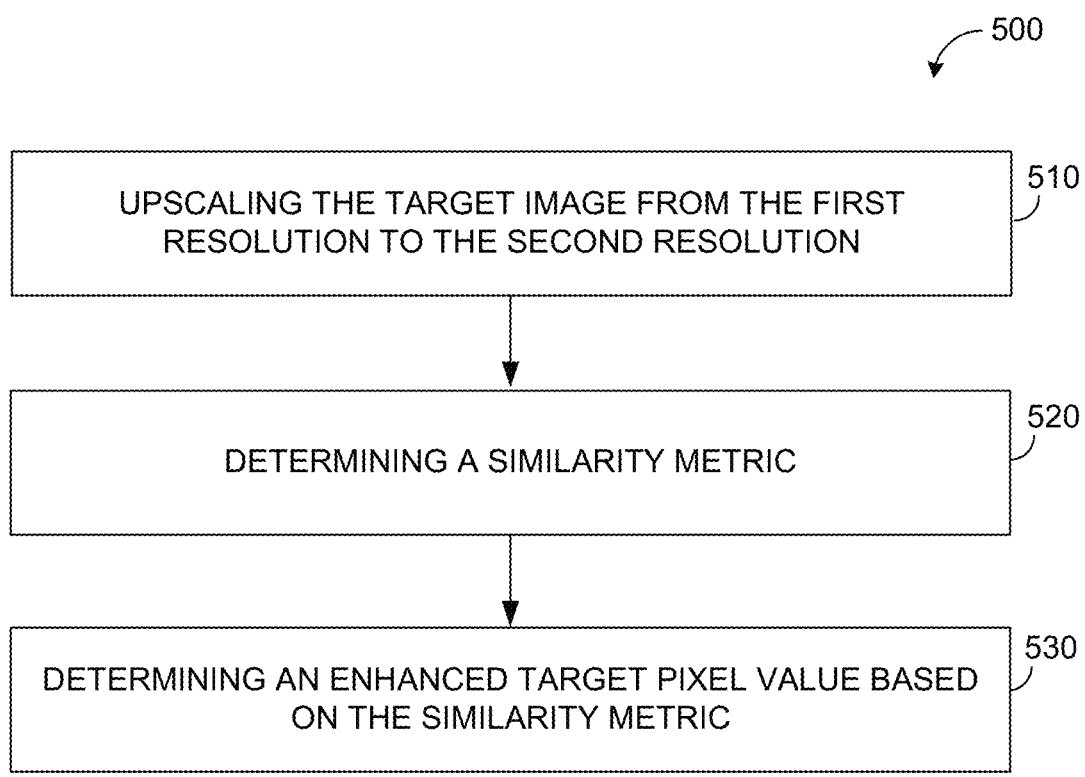
FIG. 5 is a flowchart representation of a method of generating an enhanced target image based on a target image and guide image in accordance with some implementations.

FIG. 5 is a flowchart representation of a method 500 of generating an enhanced target image based on a target image and guide image in accordance with some implementations. In some implementations (and as detailed below as an example), the method 500 is performed by an electronic device (or a portion thereof), such as the electronic device 100 of FIG. 1. In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, the method 500 includes determining enhanced target pixel values based on a similarity metric between a region of the target image and corresponding region of the guide image.

The method 500 begins, at block 510, with the electronic device upscaling the target image from the first resolution to the second resolution to generate an upscaled target image having the second resolution. The upscaled target image comprises a plurality of upscaled target pixels having a plurality of corresponding upscaled target pixel values.

In various circumstances, although the upscaled target image has the same resolution as the guide image (e.g., the second resolution), the quality of upscaled target image is less than the guide image. In particular, upscaling the target image does not increase the amount of information (e.g., regarding details) of the target image, information that can be provided by the guide image.

The method 500 continues, in block 520, with the electronic device determining a similarity metric. In various implementations, the electronic device determines a similarity metric for each pixel of the upscaled target image. In some implementations, however, the electronic device determines a similarity metric for less than all of the pixels of the upscaled target image. For ease of discussion, examples of determining a similarity metric for a single, particular upscaled target pixel are provided below.

For a particular upscaled target pixel, the similarity metric is indicative of the similarity of a neighborhood of pixels around the particular upscaled target pixel to a neighborhood of pixels around a corresponding guide pixel. In many cases, the corresponding guide pixel is the guide pixel at the same location as the upscaled target pixel. However, in some cases, the corresponding guide pixel is not the guide pixel at the same location as the upscaled target pixel. For example, during a capture process the camera (or the subject) can move between capturing a first image and a second image. Thus, as an example, the neighborhood of pixels representing a subject's eye in the upscaled target image may be at location i, whereas the neighborhood of pixels representing the subject's eye in the guide image may be at location i+Δi. Thus, in various implementations, determining the similarity metric includes determining the corresponding guide pixel, e.g., which guide pixel is the corresponding guide pixel. Such determination can be performed using optical flow algorithms or global alignment algorithms to generate, as between the upscaled target image and the guide image, an alignment map indicating, for each upscaled target pixel, the corresponding guide pixel.

In various implementations, various similarity metrics can be determined. Although a few examples are provided below, other similarity metrics can be used in the method 500. In some embodiments, the similarity metric is a normalized cross-correlation (NCC). Thus, determining the similarity metric for a particular upscaled target pixel includes determining a normalized cross-correlation between the neighborhood of pixels around the particular upscaled target pixel and the neighborhood of pixels around the corresponding guide pixel.

For an upscaled target pixel at a location i having an upscaled target pixel value of $I_T(i)$, a centered value of the upscaled target pixel (denoted $J_T(i)$) can be determined by subtracting the average of the pixel values of the neighborhood of pixels around the upscaled target pixel (denoted R+i) from the upscaled target pixel value. Thus, $J_T(i)=I_T(i)-\Sigma_{j\in R+i}I_T(j)$. In various implementations, the neighborhood is a 7×7 square surrounding the pixel. In other implementations, the neighborhood is a 3×3 square, a 5×5 square, or a non-square shape.

The upscaled target pixel has a corresponding guide pixel at a location i+Δi having a guide pixel value of $I_G(i+\Delta i)$. A centered value of the corresponding guide pixel (denoted $J_G(i)$) can be determined by subtracting the average of the pixel values of the neighborhood of pixels around the corresponding guide pixel (denoted R+i+Δi) from the corresponding guide pixel value. Thus, $J_G(i)=I_G(i+\Delta i)-\Sigma_{j\in R+i+\Delta i}I_G(j)$.

Finally, the normalized cross-correlation (NCC) can be determined as:

$$NCC(i) = \frac{\sum_{j \in R+i} J_T(j) J_G(j)}{\sqrt{\sum_{j \in R+i} J_T^2(j) \sum_{j \in R+i} J_G^2(j)}}.$$

In various implementations, a similarly metric other than a normalized cross-correlation is used. Such embodiment may use less processing power than determining a normalized cross-correlation. In some embodiments, the similarity metric is an absolute difference. Thus, determining the similarity metric for a particular upscaled target pixel includes determining an absolute difference between the neighborhood of pixels around the particular upscaled target pixel and the neighborhood of pixels around the corresponding guide pixel.

For example, the absolute difference can be determined as:

$$AD(i) = \sum_{j \in R+i} |I_T(j) - I_G(j + \Delta i)|.$$

In some embodiments, the similarity metric is a distance. Thus, determining the similarity metric for a particular upscaled target pixel includes determining a distance between the neighborhood of pixels around the particular upscaled target pixel and the neighborhood of pixels around the corresponding guide pixel.

For example, the distance can be determined as:

$$D(i) = \sqrt{\sum_{j \in R+i} (I_T(j) - I_G(j + \Delta i))^2}.$$

In some embodiments, the similarity metric is based on a heuristic. For example, the similarity metric can be a count of the number of pixel values in the neighborhood around the upscaled target pixel that differ by less than a threshold amount from corresponding pixels around the corresponding guide pixel.

In various implementations, the similarity metric is invariant to local yet smooth intensity changes. For example, the NCC is invariant to local yet smooth intensity changes. For a patch of pixels in which the upscaled target image and the guide image share the same content, it can be presumed that the relationship between the two images (at least within the patch of pixels) is $I_G = \alpha I_T + \beta$. Some similarity metrics, such as the NCC, are invariant to $\alpha$ and $\beta$.

In various implementations, calculation of the similarity metric for each pixel of a high-resolution image is computationally expensive. Accordingly, in some embodiments, a multiscale scheme is used to determine the similarity metric for each pixel. As an initial step, the similarity metric is determined for each pixel in a first band (e.g., at a first scale). For example, in various implementations, the similarly metric is determined for one pixel in every 4×4 block. For blocks in which the similarity metric is not within an ambiguity range of values, the similarity metric for the one pixel is used for each pixel in the block and no further computation need be done for the block. In an embodiment in which the similarity metric is the NCC, the ambiguity range of values can be between 0 and approximately 1 (e.g., 0.99). Thus, if the similarity metric is less than zero, it can be assumed that because the neighborhoods of the upscaled target image and the guide image around the pixel are so dissimilar, neighborhoods around nearby pixels will also be dissimilar without requiring precise computation. If the similarity metric is greater than approximately one, it can be assumed that because the neighborhoods of the upscaled target image and the guide image around the pixel are so similar, neighborhoods around nearby pixels will also be very similar without requiring precise computation. For blocks in which the similarity metric is within the ambiguity range, similarity metrics are determined in a second band (e.g., at a second scale). For example, in various implementations, the similarity metric is determined for one pixel for each 2×2 block of the 4×4 block). Again, for blocks in which the similarity metric is not within the ambiguity range, the similarity metric is used for each pixel in the block and, for blocks in which the similarity metric is within the ambiguity range, similarity metrics are determined in a third band (e.g., by determining a similarity metric for each pixel of the 2×2 block).

Accordingly, in various implementations, determining the similarity metric includes determining a first similarity metric indicative of the similarity of a neighborhood of pixels around the particular upscaled target pixel in a first band to a neighborhood of pixels around a corresponding guide pixel in the first band and, in response to determining that the first similarity metric is within an ambiguity range of values, determining a second similarity metric indicative of the similarity of a neighborhood of pixels around the particular upscaled target pixel in a second band to a neighborhood of pixels around a corresponding guide pixel in the second band.

The method continues, at block 530, with the electronic device determining an enhanced target pixel value based on the similarity metric. As noted above, in various implementations, the electronic device determines a similarity metric for each pixel of the upscaled target image. Similarly, in various implementations, the electronic device determines an enhanced target pixel value for each pixel of the upscaled target image (thereby generating the enhanced target image). In some implementations, however, the electronic device determines a similarity metric for less than all of the pixels of the upscaled target image and, similarly, the electronic device determines an enhanced target pixel value (based on the similarity metric) for less than all of the pixels of the upscaled target image. In such cases, the default pixel value for a pixel of the enhanced target image can be the upscaled target pixel value for the pixel. For ease of discussion, examples of determining an enhanced target pixel value based on the similarity metric for a single, particular upscaled target pixel are provided below.

In various implementations, the enhanced target pixel value is a weighted sum of the upscaled target pixel value and the guide pixel value. Thus, in various implementations, determining the enhanced target pixel value comprises determining a weighted sum of the corresponding upscaled target pixel value of the particular upscaled target pixel and the corresponding guide pixel value of the corresponding guide pixel, the sum being weighted by a function of the similarity metric.

In various implementations, the sum is weighted by the non-negative portion of the normalized cross-correlation (denoted NCC$^+$). The non-negative portion of the normalized cross-correlation is equal to the normalized cross-correlation when the normalized cross-correlation is positive and is equal to zero otherwise. Thus, $$NCC^+(i) = \begin{cases} NCC(i) & \text{if } NCC(i) > 0 \\ 0 & \text{otherwise} \end{cases}.$$

Accordingly, in various implementations, the enhanced target pixel value (denoted $I_E(i)$) can be determined as:

$$I_E(i) = NCC^+(i) \times I_G(i + \Delta i) + (1 - NCC^+(i)) \times I_T(i).$$

In various implementations, the enhanced target pixel value is determined based on the similarity metric using other methods. For example, in some embodiments, the enhanced target pixel value is selected, based on the similarity metric exceeding a threshold, as the guide pixel value or, based on the similarity metric failing to exceed the threshold, the upscaled target pixel value.

In various implementations, enhancing a target image based on a guide image is performed in multiple stages at multiple resolutions. Such a multistage approach has a number of advantages in various circumstances. In various circumstances, a multistage fusion reduces the amount of computation needed to perform the enhancement. In various circumstances, a multistage fusion captures similarities of various sizes or various levels of detail.

Figure 6:
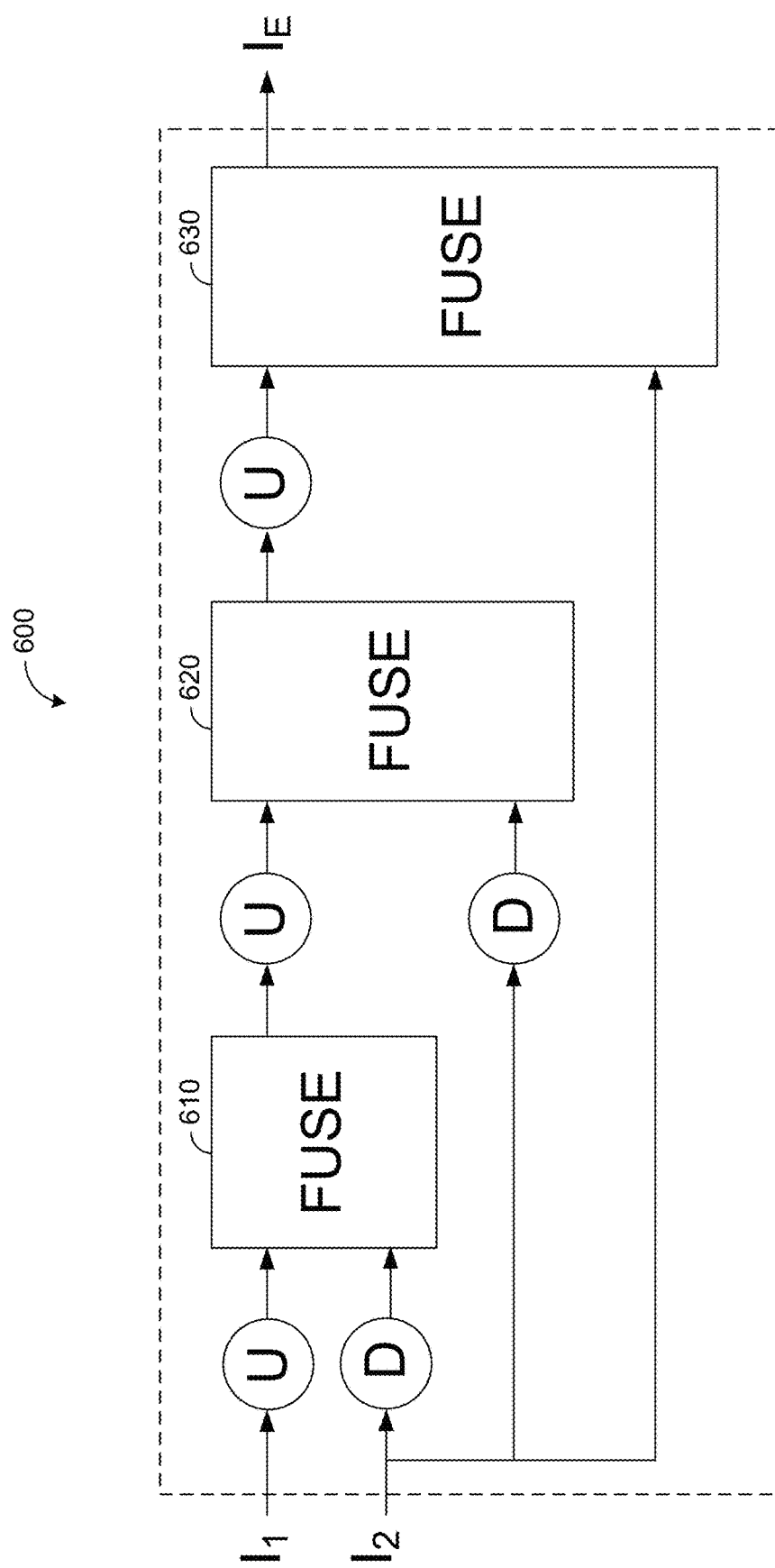
FIG. 6 illustrates a functional block diagram of a multi-stage image fusion system.

FIG. 6 illustrates a functional block diagram of a multistage image fusion system 600. The multistage image fusion system 600 receives, as inputs, a first image having a first resolution and a second image having a second (higher) resolution. The multistage image fusion system outputs an enhanced image having content of the first image at the second resolution.

In a first stage, the multistage image fusion system 600 upscales the first image to a first intermediate resolution and downscales the second image to the first intermediate resolution. The two images at the first intermediate resolution are fused, by a first fusing block 610, to create a first fused image. Thus, applying the terminology of FIGS. 4 and 5, the first image corresponds to the target image, the downscaled second image at the first intermediate resolution corresponds to the guide image, and the first fused image corresponds to the enhanced target image. Thus, following the steps set forth in FIGS. 4 and 5, the first fused image is generated by upscaling the first image (to the first intermediate resolution) and determining similarity metrics and first fused pixel values based on the similarity metrics.

In a second stage, the multistage image fusion system 600 upscales the first fused image to a second intermediate resolution and downscales the second image to the second intermediate resolution. The two images at the second intermediate resolution are fused, by a second fusing block 620, to create a second fused image. Thus, again applying the terminology of FIGS. 4 and 5, the first fused image corresponds to the target image, the downscaled second image at the second intermediate resolution corresponds to the guide image, and the second fused image corresponds to the enhanced target image. Thus, following the steps set forth in FIGS. 4 and 5, the second fused image is generated by upscaling the first fused image (to the second intermediate resolution) and determining similarity metrics and second fused pixel values based on the similarity metrics.

In a third stage, the multistage image fusion system 600 upscales the second fused image to a second resolution. The two images at the second resolution (the upscaled second fused image and the unchanged second image) are fused, by a third fusing block 630, to create the enhanced image. Thus, again applying the terminology of FIGS. 4 and 5, the second fused image corresponds to the target image, the second image corresponds to the guide image, and the enhanced image corresponds to the enhanced target image. Thus, following the steps set forth in FIGS. 4 and 5, the enhanced image is generated by upscaling the second fused image (to the second resolution) and determining similarity metrics and enhanced pixel values based on the similarity metrics.

Thus, in various implementations, generating an enhanced target image based on the target image and the guide image (as described with respect to block 430 of FIG. 4) includes downscaling the guide image from an initial guide image resolution to a plurality of intermediate resolutions. As described with respect to FIG. 6, the multistage image fusion system 600 downscales the second image from a second resolution to a first intermediate resolution and a second intermediate resolution. Further, generating the enhanced target image further includes generating intermediate fused images, based on the guide image and the target image, at the plurality of intermediate resolutions. As described with respect to FIG. 6, the multistage image fusion system 600 generates the first fused image and the second fused image.

In various implementations, obtaining the guide image (as described with respect to block 420 of FIG. 4) includes downscaling a pre-guide image having a third resolution (higher than the second resolution) and comprising a plurality of pre-guide pixels having corresponding pre-guide pixel values. For example, in the first stage of FIG. 6, the guide image is a downscaled version of the second image, the target image is the first image, and the enhanced target image is the first fused image. The electronic device (e.g., in the second and/or subsequent stages) generates a further-enhanced target image (e.g., the second fused image or the final enhanced image) based on the enhanced target image (e.g., the first fused image) and the pre-guide image.

In various implementations, obtaining the target image (as described with respect to block 410 of FIG. 4) includes generating the target image based on a pre-target image and the guide image. For example, in the third stage of FIG. 6, the target image is the second fused image (a pre-target image which is based on the first fused image and, indirectly, the first image), the guide image is the second image, and the enhanced target image is the enhanced image.

Figure 7:
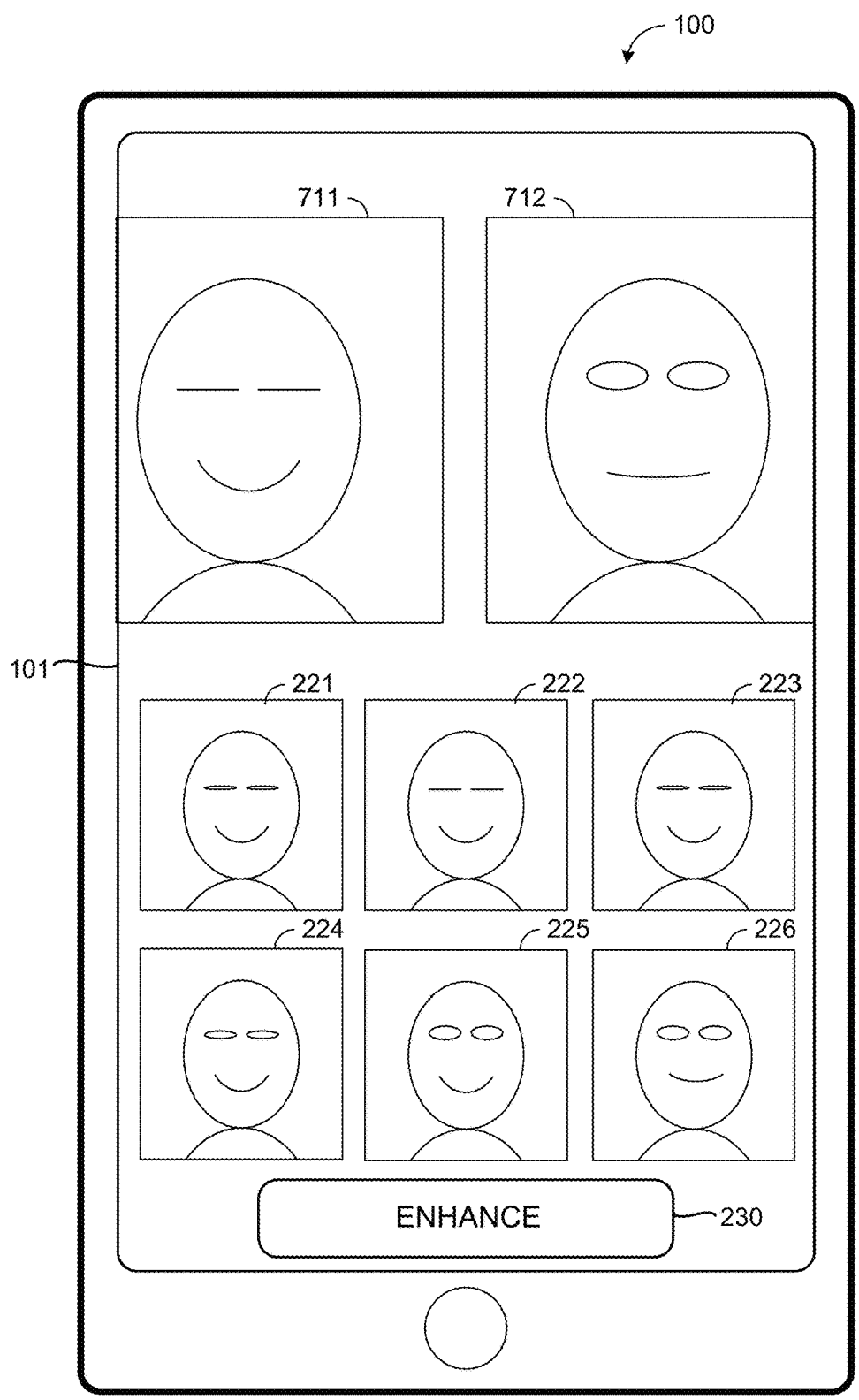
FIG. 7 illustrates the electronic device of FIG. 1 displaying an enhancing user interface on the touch-sensitive display with multiple guide images.

In various implementations, multiple guide images are used to enhance a target image. FIG. 7 illustrates the electronic device 100 of FIG. 1 displaying an enhancing user interface on the touch-sensitive display 101 with multiple guide images. The enhancing user interface includes a representation 711 of a first high-quality image, a representation of a second high-quality image, and representations 221-226 of various low-quality images. The enhancing user interface further includes the enhance affordance 230 that, when selected, enhances a selected one of the low-quality images using the high-quality images as a guide.

The representations 221-226 of the low-quality images illustrate a scene at various points in time. In the representation 221 of the first low-quality image, the subject's eyes are in the process of closing. In the representation 222 of the second low-quality image, the subject's eyes are completely closed. Similarly, in the representation 711 of the first high-quality image, the subject's eyes are completely closed. In the representation 223 of the third low-quality image and the representation 224 of the fourth low-quality image, the subject's eyes are in the process of opening. In the representation 225 of the fifth low-quality image, the subject's eyes are open. In the representation 226 of the sixth low-quality image, the subject's eye are open, but the subject has ceased (or is beginning to cease) smiling. Similarly, in the representation 712 of the second high-quality image, the subject's has ceased to smile.

Accordingly, a user can select the fifth low-quality image (e.g., by touching the representation 225 of the fifth low-quality image on the touch-sensitive display 101) as the most contextually relevant image to be enhanced. In some embodiments, upon selection, the representation 225 of the fifth low-quality image indicates that it is selected. For example, in various implementations, the representation 225 is highlighted, bordered by a glow, or presented with an overlaid checkmark.

After the representation 225 is selected and a user selects the enhance affordance 230 (e.g., touches the touch-sensitive display 101 at the location of the enhance affordance 230), the electronic device 100 merges the high-quality images and the selected low-quality image.

FIGS. 8A-8C illustrate the result of merging high-quality images with one or more selected low-quality images. In FIGS. 8A-8C, quality (e.g., level of detail) is represented by shading, where high quality images (or portions thereof) are represented without shading and low quality images (and portions thereof) are represent with shading.

FIG. 8A illustrates that when a low quality image 820 (a representation 225 being shown in FIG. 7) is merged with a first high quality image 811 (a representation 711 being shown in FIG. 7), the resulting image 831 is generally high quality except for a region 841 around the eyes of the subject. In particular, the information required to generate a high level of detail in the region 841 of the subject with eyes open is not present in the low quality image 820 or the first high quality image 811 and, thus, cannot be imported into the resulting image 831.

FIG. 8B illustrates that when the low quality image 820 is merged with a second high quality image 812 (a representation 712 being shown in FIG. 7), the resulting image 832 is generally high quality except for a region 842 around the mouth of the subject. In particular, the information required to generate a high level of detail in the region 842 of the subject smiling is not present in the low quality image 820 or the second high quality image 812 and, thus, cannot be imported into the resulting image 832.

FIG. 8C illustrates that when the low quality image 820 is merged with both the first high quality image 811 and the second high quality image 812, the resulting image 833 is high quality in all regions. The information required to generate a high level of detail in the region 841 of the subject's eyes is present in the second high quality image 812 and the information required to generate a high level of detail in the region 842 of subject's mouth is present in the first high quality image 811.

Accordingly, in various implementations, an electronic device, in addition to obtaining a target image having a first resolution (as described in block 410 of FIG. 4) and obtaining a guide image having a second resolution (as described in block 420 of FIG. 4, obtains a second guide image having the second resolution and comprising a plurality of second guide pixels having corresponding second guide pixel values. The electronic device generates the enhanced target image based on the target image and the guide image (as described in block 430 of FIG. 4) and further based on the second guide image. To that end, the electronic device, in addition to determining, for a particular upscaled target pixel, a similarity metric (as described in block 520 of FIG. 5), determines, for the particular upscaled target pixel, a second similarity metric indicative of the similarity of the neighborhood of pixels around the particular upscaled target pixel to a neighborhood of pixels around a corresponding second guide pixel. Further, the electronic device determines the enhanced target pixel value based on the similarity metric (as described in block 530 of FIG. 5) and further based on the second similarity metric.

Determining an enhanced target pixel value using multiple similarity metrics can be performed in any number of ways. In some embodiments, the enhanced target pixel value is further based on the sharpness of the guide image and the second guide image. Thus, in various implementations, determining the enhanced target pixel value is further based on a sharpness of the neighborhood of pixels around the corresponding guide pixel and a sharpness of the neighborhood of pixels around the corresponding second guide pixel.

In some embodiments, the enhanced target pixel value is based on the upscaled target pixel value and only one of the corresponding guide pixel values (e.g., the corresponding guide pixel value of the guide image having the largest similarity metric, the greatest sharpness, or some combination thereof). In some embodiments, the enhanced target pixel value is based on the upscaled target pixel value and multiple corresponding guide pixel values (and, possibly, multiple measures of sharpness).

For example, in one embodiment, the enhanced target pixel value is a weighted sum of the upscaled target pixel value, the corresponding guide pixel value, and the corresponding second guide pixel value, weighted by the non-negative portion of the respective NCC and a sharpness metric (denoted S).

Accordingly, in various implementations, the enhanced target pixel value can be determined as:

$$I_E(i) = S_1(i) \times NCC_1^+(i) \times I_{G1}(i+\Delta i_1) + S_2(i) \times NCC_2^+(i) \times I_{G2}(i+\Delta i_2) + (1 - S_1(i) \times NCC_1^+(i) - S_2(i) \times NCC_2^+(i)) * I_T(i).$$

Figure 9:
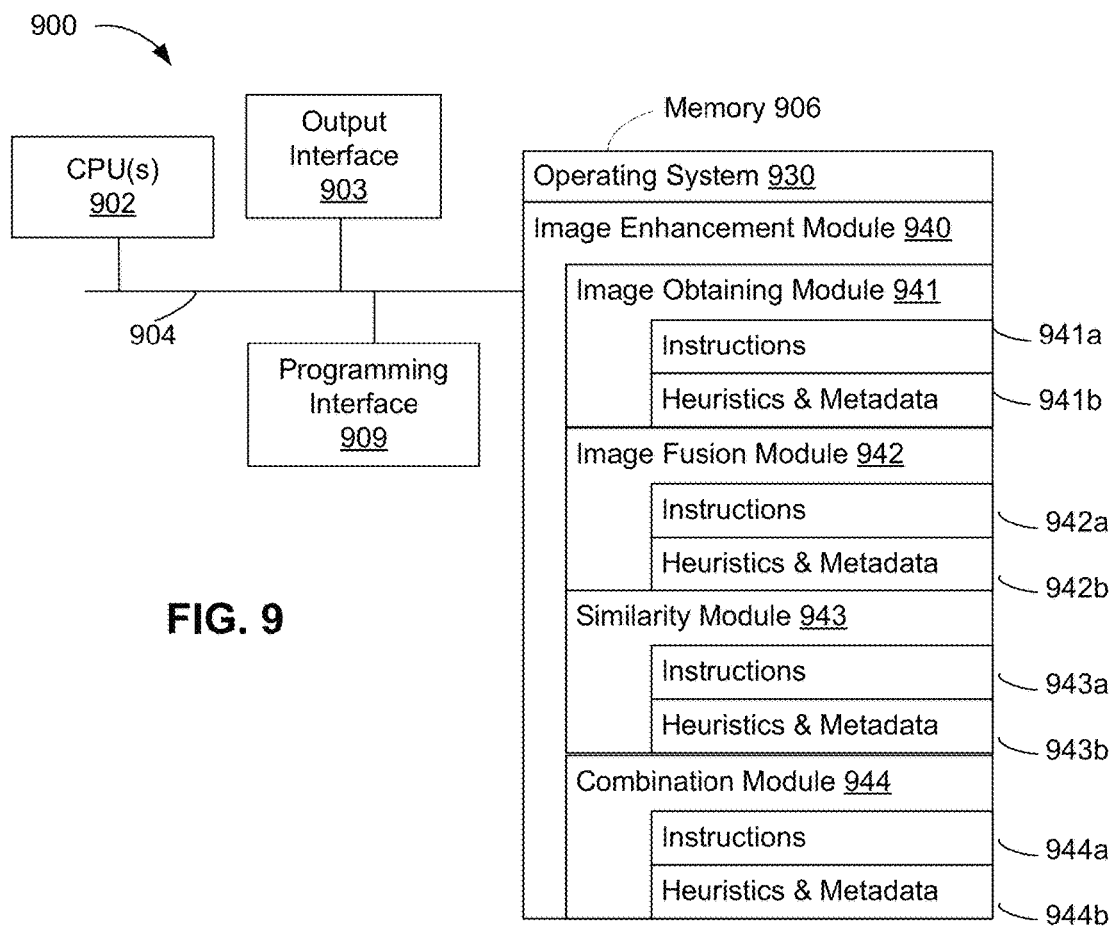
FIG. 9 is a block diagram of a computing device in accordance with some implementations.

FIG. 9 is a block diagram of a computing device 900 in accordance with some implementations. In some implementations, the computing device 900 corresponds to the at least a portion of the electronic device 100 of FIG. 1 and performs one or more of the functionalities described above with respect to the electronic device. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPUs) 902 (e.g., processors), one or more input/output interfaces 903 (e.g., a network interface and/or a sensor interface), a memory 906, a programming interface 909, and one or more communication buses 904 for interconnecting these and various other components.

In some implementations, the communication buses 904 include circuitry that interconnects and controls communications between system components. The memory 906 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 906 optionally includes one or more storage devices remotely located from the CPU(s) 302. The memory 906 comprises a non-transitory computer readable storage medium. Moreover, in some implementations, the memory 906 or the non-transitory computer readable storage medium of the memory 906 stores the following programs, modules and data structures, or a subset thereof including an optional operating system 930 and an image enhancement module 940. In some implementations, one or more instructions are included in a combination of logic and non-transitory memory. The operating system 930 includes procedures for handling various basic system services and for performing hardware dependent tasks. In some implementations, the image enhancement module 940 is configured to enhance a target image using a guide image. To that end, the image enhancement module 940 includes an image obtaining module 941, an image fusion module 942, a similarity module 943, and a combination module 944.

In some implementations, the image obtaining module 941 is configured to obtain a target image having a first resolution and comprising a plurality of target pixels having a plurality of corresponding target pixel values and configured to obtain a guide image having a second resolution and comprising a plurality of guide pixels having a plurality of corresponding guide pixel values. To that end, the image obtaining module 941 includes a set of instructions 941a and heuristics and metadata 941b. In some implementations, the image fusion module 942 is configured to generate an enhanced target image based on the target image and the guide image, the enhanced target image having the second resolution and comprising a plurality of enhanced target pixels having a plurality of corresponding enhanced target pixel values. To that end, the image fusion module 942 includes a set of instructions 942a and heuristics and metadata 942b. In some implementations, in generating the enhanced target image, the image fusion module 942 is configured to upscale the target image from the first resolution to the second resolution to generate an upscaled target image having the second resolution and comprising a plurality of upscaled target pixels having a plurality of corresponding upscaled target pixel values. In various embodiments, the image fusion module 942 calls the similarity module 943 and the combination module 944. In some implementations, the similarity module 943 is configured to determine, for a particular upscaled target pixel of the plurality of upscaled target pixels, a similarity metric, wherein the similarity metric is indicative of the similarity of a neighborhood of pixels around the particular upscaled target pixel to a neighborhood of pixels around a corresponding guide pixel. To that end, the similarity module 943 includes a set of instructions 943a and heuristics and metadata 943b. In some implementations, the combination module 944 is configured to determine, for the particular upscaled target pixel, an enhanced target pixel value based on the similarity metric. To that end, the combination module 944 includes a set of instructions 944a and heuristics and metadata 944b.

Although the image enhancement module 940, the image obtaining module 941, the image fusion module 942, the similarity module 943, and the combination module 944 are illustrated as residing on a single computing device 900, it should be understood that in other embodiments, any combination of the image enhancement module 940, the image obtaining module 941, the image fusion module 942, the similarity module 943, and the combination module 944 can reside in separate computing devices in various implementations. For example, in some implementations each of the image enhancement module 940, the image obtaining module 941, the image fusion module 942, the similarity module 943, and the combination module 944 reside on a separate computing device or in the cloud.

Moreover, FIG. 9 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs or GP-GPUs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. A method comprising:
obtaining a target image having a first resolution and comprising a plurality of target pixels having a plurality of corresponding target pixel values;
obtaining a guide image having a second resolution and comprising a plurality of guide pixels having a plurality of corresponding guide pixel values; and
generating an enhanced target image based on the target image and the guide image, the enhanced target image having the second resolution and comprising a plurality of enhanced target pixels having a plurality of corresponding enhanced target pixel values, wherein generating the enhanced target image comprises:
upscaling the target image from the first resolution to the second resolution to generate an upscaled target image having the second resolution and comprising a plurality of upscaled target pixels having a plurality of corresponding upscaled target pixel values;
determining, for a particular upscaled target pixel of the plurality of upscaled target pixels, a similarity metric, wherein the similarity metric is indicative of the similarity of a neighborhood of pixels around the particular upscaled target pixel to a neighborhood of pixels around a corresponding guide pixel; and
determining, for the particular upscaled target pixel, an enhanced target pixel value based on the similarity metric.

2. The method of claim 1, wherein determining the similarity metric comprises determining a normalized cross-correlation (NCC) between the neighborhood of pixels around the particular upscaled target pixel and the neighborhood of pixels around the corresponding guide pixel.

3. The method of claim 2, wherein determining the enhanced target pixel value comprises determining a weighted sum of the corresponding upscaled target pixel value of the particular upscaled target pixel and the corresponding guide pixel value of the corresponding guide pixel, the sum being weighted by the non-negative portion of the NCC.

4. The method of claim 1, wherein determining the similarity metric comprises:
determining a first similarity metric indicative of the similarity of a neighborhood of pixels around the particular upscaled target pixel in a first band to a neighborhood of pixels around a corresponding guide pixel in the first band; and
in response to determining that the first similarity metric is within an ambiguity range of values, determining a second similarity metric indicative of the similarity of a neighborhood of pixels around the particular upscaled target pixel in a second band to a neighborhood of pixels around a corresponding guide pixel in the second band.

5. The method of claim 1, wherein generating an enhanced target image based on the target image and the guide image comprises:
downscaling the guide image from an initial guide image resolution to a plurality of intermediate resolutions; and
generating intermediate fused images, based on the guide image and the target image, at the plurality of intermediate resolutions.

6. The method of claim 1, wherein obtaining the guide image comprises downscaling a pre-guide image having a third resolution and comprising a plurality of pre-guide pixels having corresponding pre-guide pixel values, the method further comprising generating an further-enhanced target image based on the enhanced target image and the pre-guide image, the further-enhanced target image having the third resolution and comprising a plurality of further-enhanced target pixels having a plurality of corresponding further-enhanced target pixel values.

7. The method of claim 1, wherein obtaining the target image comprises generating the target image based on a pre-target image and the guide image, wherein generating the target image comprises:
downscaling the guide image from the second resolution to the first resolution to generate a pre-guide image having the first resolution and comprising a plurality of pre-guide pixels having a plurality of corresponding pre-guide pixel values;
upscaling the pre-target image from a third resolution to the first resolution to generate an upscaled pre-target image having the first resolution and comprising a plurality of upscaled pre-target pixels having a plurality of corresponding upscaled pre-target pixel values;
determining, for a particular upscaled pre-target pixel of the plurality of upscaled pre-target pixels, a similarity metric, wherein the similarity metric is indicative of the similarity of a neighborhood of pixels around the particular upscaled pre-target pixel to a neighborhood of pixels around a corresponding pre-guide pixel; and
determining, for the particular upscaled pre-target pixel, a target pixel value based on the similarity metric.

8. The method of claim 1, further comprising obtaining a second guide image having the second resolution and comprising a plurality of second guide pixels having a plurality of corresponding second guide pixel values, wherein generating the enhanced target image is further based on the second guide image, wherein generating the enhanced target image further comprises determining, for the particular upscaled target pixel, a second similarity metric, wherein the second similarity metric is indicative of the similarity of the neighborhood of pixels around the particular upscaled target pixel to a neighborhood of pixels around a corresponding second guide pixel, and wherein determining the enhanced target pixel value is further based on the second similarity metric.

9. The method of claim 8, wherein the determining the enhanced target pixel value is further based on a sharpness of the neighborhood of pixels around the corresponding guide pixel and a sharpness of the neighborhood of pixels around the corresponding second guide pixel.

10. The method of claim 1, further comprising:
detecting, via an input device of an electronic device, a capture input; and
in response to detecting the capture input, capturing, via a camera of the electronic device, a high-resolution image of a scene and a sequence of low-resolution images of the scene.

11. The method of claim 10, wherein obtaining the target image comprises:
displaying, on a display, a set of potential target images of the sequence of low-resolution images of the scene; and
receiving, via an input device, a selection of the target image from the set of potential target images.

12. The method of claim 11, wherein the set of potential target images includes at least one of: the sequence of low-resolution images of the scene, a downsampled sequence of the sequence of low-resolution images of the scene, and those of the sequence of low-resolution images that can be improved by the high-resolution image.

13. The method of claim 11, wherein the target image is a color component of a multi-color image and selection of the target image comprises selection of the multi-color image.

14. The method of claim 1, wherein determining the similarity metric further comprises determining the corresponding guide pixel.

15. The method of claim 14, wherein the corresponding guide pixel is not at the same location as the particular upscaled target pixel.

16. The method of claim 14, wherein determining the corresponding guide pixel comprises generating, as between the upscaled target image and the guide image, an alignment map.

17. A non-transitory computer-readable medium having instructions encoded thereon that, when executed by one or more processors of an electronic device, causes the electronic device to perform a method comprising:
- obtaining a target image having a first resolution and comprising a plurality of target pixels having a plurality of corresponding target pixel values;
- obtaining a guide image having a second resolution and comprising a plurality of guide pixels having a plurality of corresponding guide pixel values; and
- generating an enhanced target image based on the target image and the guide image, the enhanced target image having the second resolution and comprising a plurality of enhanced target pixels having a plurality of corresponding enhanced target pixel values, wherein generating the enhanced target image comprises:
  - upscaling the target image from the first resolution to the second resolution to generate an upscaled target image having the second resolution and comprising a plurality of upscaled target pixels having a plurality of corresponding upscaled target pixel values;
  - determining, for a particular upscaled target pixel of the plurality of upscaled target pixels, a similarity metric, wherein the similarity metric is indicative of the similarity of a neighborhood of pixels around the particular upscaled target pixel to a neighborhood of pixels around a corresponding guide pixel; and
  - determining, for the particular upscaled target pixel, an enhanced target pixel value based on the similarity metric.

18. The non-transitory computer-readable medium of claim 17, wherein determining the similarity metric comprises determining a normalized cross-correlation (NCC) between the neighborhood of pixels around the particular upscaled target pixel and the neighborhood of pixels around the corresponding guide pixel.

19. The non-transitory computer-readable medium of claim 18, wherein determining the enhanced target pixel value comprises determining a weighted sum of the corresponding upscaled target pixel value of the particular upscaled target pixel and the corresponding guide pixel value of the corresponding guide pixel, the sum being weighted by the non-negative portion of the NCC.

20. A system comprising:
- a non-transitory memory; and
- one or more processors configured to:
  - obtain a target image having a first resolution and comprising a plurality of target pixels having a plurality of corresponding target pixel values;
  - obtain a guide image having a second resolution and comprising a plurality of guide pixels having a plurality of corresponding guide pixel values; and
  - generate an enhanced target image based on the target image and the guide image, the enhanced target image having the second resolution and comprising a plurality of enhanced target pixels having a plurality of corresponding enhanced target pixel values, wherein the one or more processors are configured to generate the enhanced target image by:
    - upscaling the target image from the first resolution to the second resolution to generate an upscaled target image having the second resolution and comprising a plurality of upscaled target pixels having a plurality of corresponding upscaled target pixel values;
    - determining, for a particular upscaled target pixel of the plurality of upscaled target pixels, a similarity metric, wherein the similarity metric is indicative of the similarity of a neighborhood of pixels around the particular upscaled target pixel to a neighborhood of pixels around a corresponding guide pixel; and
    - determining, for the particular upscaled target pixel, an enhanced target pixel value based on the similarity metric.

* * * * *